Feb. 26, 1929.

J. C. HANSEN-ELLEHAMMER 1,703,669

AUTOMOBILE FIRE ENGINE

Filed May 18, 1926

Inventor
Jacob Christian Hansen-Ellehammer
By C. P. Goepel
his attorney.

Patented Feb. 26, 1929.

1,703,669

UNITED STATES PATENT OFFICE.

JACOB CHRISTIAN HANSEN-ELLEHAMMER, OF HELLERUP, DENMARK.

AUTOMOBILE FIRE ENGINE.

Application filed May 18, 1926, Serial No. 109,884, and in Denmark February 18, 1926.

The present invention relates to an automobile fire engine and includes a rotary pump constituting the fire extinguisher proper together with its driving shaft which is mounted on a jack means movably fitted to the chassis. The said driving shaft may in known manner be rotated by means of a belt from the rear wheels of the automobile when these are raised from the ground. The fire engine proper and jack means and pump thus constitute a unit to be mounted on or removed from the chassis.

If the said body part be arranged for use on one of the standard types of automobiles, an automobile fire engine can consequently be had by mounting said jack means either on a new chassis of such standard type or on a chassis already provided with a body, the new and the old body simply being interchanged. The said body is provided with and contains everything necessary for driving and utilizing the said pump and an automobile fire engine can thus be readily procured in a cheap and quick manner. In view of the fact that automobiles of standard types, for example, those of the Ford type, are spread all over the country in great numbers it will, as a rule, be an easy matter to get hold of an automobile to which my present invention may be readily applied.

The mounting of the pump, etc. on the jack means is such as to allow of the pump being made ready for operation in an easy and quick manner and without the use of skilled labour. The pump is suitably mounted on a frame which is rotatable around an axis parallel to the rear axle of the automobile and which carries a pair of supporting members which, when the frame is swung down into an approximately horizontal position, will rest on the ground and will, by the frame being swung further, act as a centre of rotation during the raising from the ground of the rear end of the automobile.

The rear axle and the chassis of an automobile are interconnected by the rear springs only which are designed for taking up pulls in a vertical direction, and on the rear end of the automobile being raised from the ground the rear axle will not, consequently, follow this movement until the said springs have been considerably extended in a vertical direction. In order that the rear axle shall immediately follow the raising movement and thus to reduce to a minimum the height to which the rear axle must be raised, a hook or the like is provided on each side of the body part and in a vertical line through the rear axle which hooks may engage the ends of the rear axle before the raising of same is initiated. By this arrangement the rear axle will immediately follow the raising movement of the rear part of the automobile. The said connection between the body part and the rear axle is arranged so as to be made or released automatically.

When the raising operation has been completed, the raising appliances will assume such a position that equilibrium is automatically established of the whole system and particular manipulations or arrangements are therefore not needed for securing the raised portions in position. The automobile motor can now be started and will rotate the rear wheels in the air and by connecting pulleys fitted to the pump driving shaft to the rear wheels by means of belts the fire engine can be put into operation.

The invention is shown on the drawing where the body part is shown mounted on a chassis of the Ford type.

Figure 1:
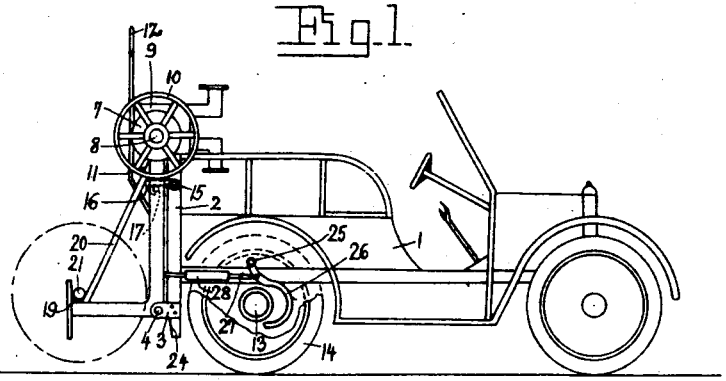
Fig. 1 is a side view of the fire engine ready for driving on the road.
Figure 2:
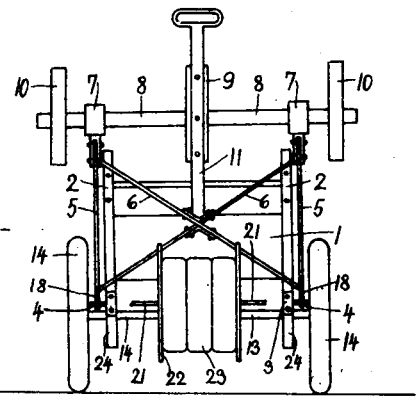
Fig. 2 is a rear view thereof and partly in section.

The body part consists of a box 1 having seats for the driver and the firemen and with room for appliances and accessories. The rear end of the box 1 is provided in its corners with two angle-irons 2 projecting below the bottom of the body part. The said irons have two eyes 3 carrying bearings for a common shaft or carrying two pins 4 around which a jack frame consisting of two side members 5 and a cross connection 6 may be rotated.

The end of either side members 5 carries a casing 7 containing a ball bearing for a shaft 8 driving the pump which shaft extends through the casing 9 of the pump and carries on either end a pulley 10. The casing 9 is by means of an arm 11 having a handle 12 connected to the cross connection of the frame and the casing 9 is consequently secured in position when the shaft 8 is rotating. The shafts 8 and 4 are parallel to the automobile rear shaft 13, and the distance between the pulleys 10 is somewhat greater than the distance between the rear wheels 14.

The frame 5, 6 is secured in the position shown in Fig. 1 by means of two hooks or pawls 16 fitted to a shaft 15 through the irons 2 and adapted to engage pins 17 on the side members 5.

The side members 5 carry at their bottom ends brackets 18 forming an angle of approximately 90° with said side members. The ends of the brackets 18 are provided with plates 19 and the brackets are rigidly connected to the side members 5 by means of inclined bars 20. The brackets 18 or the bars 20 carry bearings for a shaft 21 provided with a drum for fire hoses 23. The shaft 21 carries outside the ends of said drum idle wheels 22 having a diameter larger than that of the drum with the hoses thereon so that the drum can rotate between the said wheels 22. By this arrangement the hoses may, without risk of their being damaged or soiled on the earth, readily and quickly be brought to the desired place. The drum with its hoses is rather heavy and it is therefore an advantage to have the drum fitted on the automobile as shown on the drawing at a relatively small height above the ground because the men standing on the ground and handling the drum will be in a better position to do so than if the drum is, as is frequenly the case, fitted on the fire engine at a relatively great height above the ground.

When the fire engine is to be put into operation the frame 5, 6 is swung down into a horizontal position rotating around the pins 4. The brackets 18 will now abut with their end plates 19 on the ground and when a pull in a downward direction is exerted on the handle 12 the rear end of the automobile can now be raised so that the automobile will assume the position shown in Fig. 3, in which the brackets 18 have been rotated a suitable distance beyond their vertical position, and will abut against the lower end 24 of the irons 2. In this position the automobile will be in a stable balance.

In the latter position of the frame 5, 6 the brackets 18 will aso serve as a centre of rotation during the raising operation of the automobile, and in their other position they will serve as a support for the drum with its hoses.

Figure 3:
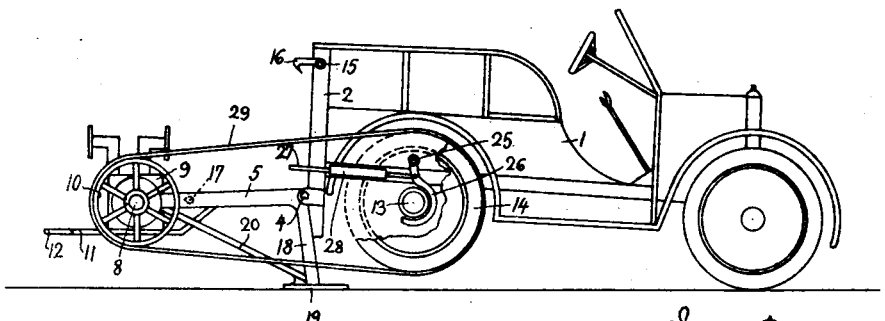
Fig. 3 is a side view of the fire engine ready for acting as a fire extinguisher.

When the rear end of the automobile is raised, the rear shaft 13 being connected to the chassis by means of the rear springs only, would not follow the movement of the body until the rear end has been raised to a relatively great height because the rear springs will simply open. In order to enable the rear shaft 13 and thus the rear wheels 14 to quickly follow the raising movement so that this movement may be limited to a minimum, the following arrangement has been designed: On either side of the body part a pin 25 is provided vertically above the rear shaft 13. A hook 26 is rotatably mounted on said pin 25 and carries a small bar 27 slidably journalled in a guide 28 and the rear end of which bar abuts against the front side of the side member 5 in the position of the latter shown in Fig. 1. The bars 27 are of such a length that the hooks 26 in the said position of the frame are held out of engagement with the shaft 13. However, as soon as the frame 5, 6 is swung out from its vertical position the two hooks 26 will fall by gravity and assume substantially vertical positions in engagement with the ends of the shaft 13 as shown in Fig. 3 to thus rigidly connect the shaft or axle to the automobile body. When therefore, the rear end of the automobile is raised by the frame 5, 6 being swung down and rotated around the end plates 19, the shaft 13 and the rear wheels 14 will immediately follow the raising movement and the rear wheels 14 will, consequently, very quickly become free of the ground.

When the frame 5, 6 is swung back into its vertical position (Fig. 1) the side members will, shortly before the said position is reached, abut against the ends of the bars 27 and press them backwards by which movement the hooks 26 will be disengaged from the shaft 13 and the mechanism will then assume the position shown in Fig. 1 in which the fire engine is ready for driving along the road. It will thus be seen that the mechanism is operating automatically.

When the frame 5, 6 has been swung down into the position shown in Fig. 3 the automobile motor is started and when the clutch has been engaged the rear wheels 14 will rotate freely in the air. Belts 29 can now be laid over the rear wheels and the pulleys 10 in the manner used in workshops and when the suction hose of the pump is connected to water the fire engine is ready for operation. The speed of the pump can be varied by means of the gear mechanism of the automobile.

It is advantageous to arrange the mechanism in such a manner that the three parallel shafts 13, 4 and 8 are approximately all in one plane when the frame is in the position shown in Fig. 3.

I claim:

1. In combination with a motor vehicle, a frame pivotally mounted upon the rear end of the vehicle for movement to and from substantially vertical and horizontal positions relative to the vehicle, said frame at its pivoted end having means adapted to engage the ground surface when the frame is moved to a horizontal position to elevate the rear end of the vehicle and lift the wheels out of contact with the ground surface, a device to be operated carried by said frame, and means for operatively connecting said device with one of the rear wheels.

2. In combination with a motor vehicle, a frame pivotally mounted upon the rear end of the vehicle for movement to and from substantially vertical and horizontal positions relative to the vehicle, said frame at its pivoted end having means adapted to engage the ground surface when the frame is moved to a horizontal position to elevate the rear end of the vehicle and lift the wheels out of contact with the ground surface, a movable means on the vehicle frame engageable with the rear axle to prevent relative vertical movement of the axle and frame when the end of the vehicle is elevated, a device to be operated carried by said frame, and means for operatively connecting said device with one of the rear wheels.

3. In combination with a motor vehicle, a frame pivotally mounted upon the rear end of the vehicle for movement to and from substantially vertical and horizontal positions relative to the vehicle, said frame at its pivoted end having means adapted to engage the ground surface when the frame is moved to a horizontal position to elevate the rear end of the vehicle and lift the wheels out of contact with the ground surface, a movable means on the vehicle frame engageable with the rear axle to prevent relative vertical movement of the axle and frame when the end of the vehicle is elevated, a device to be operated carried by said frame, means for operatively connecting said device with one of the rear wheels, and means connected with said movable axle engaging means engaged and actuated by said pivoted frame when moved to its vertical position to disengage said movable means from the wheel axle.

4. In combination with a motor vehicle, a frame pivotally mounted upon the rear end of the vehicle for vertical movement and adapted in one position thereof to extend rearwardly from the vehicle, said frame having angular extensions projecting from the pivot thereof and adapted to engage the ground surface as the frame is moved to such extended position to elevate the rear end of the vehicle and support the same with the rear wheels out of contact with the ground, the rear end of the vehicle having means limiting the movement of the frame to such position, a device carried by said frame and movable therewith and adapted to be operated from the motor of the vehicle, and means for latching said pivoted frame in a substantially vertical position closely adjacent to the rear end of the vehicle body.

5. In combination with a motor vehicle, jack means movably mounted upon the rear end of the vehicle and having means to engage the ground surface upon movement relative to the vehicle body to elevate said end of the vehicle body and disengage the rear wheels from the ground surface, and means automatically controlled by a movable part of the jack means to rigidly connect the vehicle body with the rear wheel axle upon operation of the jack means to elevate the same as a unit and to release the said connection when the jack means is returned to normal position and thereby permit of vertical movement of the body relative to the wheel axle.

In testimony whereof I affix my signature.

JACOB CHRISTIAN HANSEN-ELLEHAMMER.